(12) United States Patent
Grabarnik et al.

(10) Patent No.: US 7,631,058 B2
(45) Date of Patent: Dec. 8, 2009

(54) SYSTEMS AND METHODS FOR VALIDATION, COMPLETION AND CONSTRUCTION OF EVENT RELATIONSHIP NETWORKS

(75) Inventors: Genady Grabarnik, Briarcliff Manor, NY (US); Joseph L. Hellerstein, Ossining, NY (US); Sheng Ma, Briarcliff Manor, NY (US); Chang-Shing Perng, Bedford Hills, NY (US); David Hutchinson Thoenen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1810 days.

(21) Appl. No.: 09/976,543

(22) Filed: Oct. 12, 2001

(65) Prior Publication Data

US 2003/0074440 A1 Apr. 17, 2003

(51) Int. Cl.
*G06F 15/173* (2006.01)
(52) U.S. Cl. ..................................... 709/223
(58) Field of Classification Search .................. 706/47, 706/16, 14; 707/104.1; 709/224, 220, 223; 600/515; 702/80, 183; 700/90
See application file for complete search history.

(56) References Cited

U.S. PATENT DOCUMENTS

| 5,345,380 | A | * | 9/1994 | Babson et al. | 700/90 |
|---|---|---|---|---|---|
| 5,822,741 | A | * | 10/1998 | Fischthal | 706/16 |
| 6,006,213 | A | * | 12/1999 | Yoshida | 706/14 |
| 6,108,698 | A | * | 8/2000 | Tenev et al. | 709/220 |
| 6,249,755 | B1 | * | 6/2001 | Yemini et al. | 702/183 |
| 6,493,723 | B1 | * | 12/2002 | Busche | 707/104.1 |
| 6,571,120 | B2 | * | 5/2003 | Hutten | 600/515 |
| 6,694,364 | B1 | * | 2/2004 | Du et al. | 709/224 |
| 6,697,791 | B2 | * | 2/2004 | Hellerstein et al. | 706/47 |
| 2002/0120734 | A1 | * | 8/2002 | Riosa et al. | 709/224 |
| 2004/0015310 | A1 | * | 1/2004 | Yuste et al. | 702/80 |

OTHER PUBLICATIONS

Jian et al., PrefixSpan: Mining sequential patterns efficiently by prefix-projected pattern growth, Data Engineering, 2001, Proceedings, 17th International Conference on Feb. 6, 2001.*
Mishra D., Snoop: An Event Specification Language for Active Database Systems, A thesis presented to the graduate school of teh U. of Flordia in partial fulfillment of teh requirements for the degree of master science, 1991.*
Bettini et al., Testing complex temporal relationships involving multiple granularities and its application to data mining, 1996, ACM.*

(Continued)

*Primary Examiner*—William C Vaughn, Jr.
*Assistant Examiner*—Scott Christensen
(74) *Attorney, Agent, or Firm*—Louis J. Percello; Ryan, Mason & Lewis, LLP

(57) ABSTRACT

Techniques for data-driven validation, completion and construction of event relationship networks (ERNs) are provided. Event relationship networks are widely used in event management system design. To date, ERNs are constructed purely based on human expertise and there is no automatic or event semi-automatic method that validates or completes ERNs. The present invention provides techniques for automatically validating and completing existing ERNs and/or constructing new ERNs, based on collected event data.

25 Claims, 7 Drawing Sheets

OTHER PUBLICATIONS

U.S. Appl. No. 09/976,540, filed Oct. 12, 2001, G. Grabarnik et al., "Systems and Methods for Providing Off-Line Decision Support for Correlation Analysis".

U.S. Appl. No. 09/976,574, filed Oct. 12, 2001, G. Grabarnik et al., "Systems and Methods for Pairwise Analysis of Event Data".

Thoenen et al., "Event Relationship Networks: A Framework for Action Oriented Analysis in Event Management," International Symposium on Integrated Network Management, 2001.

* cited by examiner

| | TIMESTAMP | TRAP | TIME | HOST | CATEGORY | MESSAGE |
|---|---|---|---|---|---|---|
| 314 | 983079659 | 3 | FEB 25 00:40:59 | HOST1 | N | NODE UP. |
| 316 | 983079659 | 3 | FEB 25 00:40:59 | HOST2 | N | INTERFACE css0 UP. |
| 318 | 983079659 | 7 | FEB 25 00:40:59 | HOST2 | N | NODE MARGINAL. |
| 320 | 983079659 | 3 | FEB 25 00:40:59 | HOST3 | N | INTERFACE ip1 UP. |
| 322 | 983079659 | 3 | FEB 25 00:40:59 | HOST3 | N | NODE UP. |
| 324 | 983079659 | 3 | FEB 25 00:40:59 | HOST4 | N | INTERFACE css0 UP. |
| 326 | 983079659 | 7 | FEB 25 00:40:59 | HOST4 | N | NODE MARGINAL. |
| 328 | 983079659 | 7 | FEB 25 00:40:59 | HOST5 | N | SEGMENT ip1. |
| 330 | 983079659 | 7 | FEB 25 00:40:59 | HOST5 | N | NETWORK ip1 UP. |
| 332 | 983079660 | 3 | FEB 25 00:41:00 | HOST6 | N | INTERFACE tr0 DOWN. |
| 334 | 983079660 | 3 | FEB 25 00:41:00 | HOST6 | N | NODE DOWN. |

SYSTEMS AND METHODS FOR VALIDATION, COMPLETION AND CONSTRUCTION OF EVENT RELATIONSHIP NETWORKS

FIELD OF THE INVENTION

The present invention relates generally to event management of distributed systems and, more particularly, to techniques for automatic and semi-automatic validation, completion and construction of event relationship networks.

BACKGROUND OF THE INVENTION

High quality event management has long been seen as the cornerstone of a healthy business and Information Technology (IT) operation environment. As every business is becoming an electronic business (e-business), the demand from IT service customers has evolved from reactive management toward proactive management. Enormous academic research and commercial products have attempted to achieve proactive management by root cause analysis (RCA). However, what RCA can provide does not match well with the needs of two primary goals of event management:

(1) Rapid detection of, and a fast response to, exceptional situations; and (2) Precise and accurate identification of the problem scope (hosts, networks, people, etc.).

In response to these real-world operational demands, a new paradigm referred to as action-oriented analysis (AOA) has recently been proposed, see, e.g., Thoenen et al., "Event Relationship Networks: A Framework for Action Oriented Analysis for Event Management," International Symposium on Integrated Network Management, 2001, the disclosure of which is incorporated by reference herein. The concepts of AOA is concretized as the Event Management Design (EMD) methodology which contains four activities:

(1) Select the event sources;
(2) Take inventory of all events;
(3) Document event policy and processing decisions; and
(4) Construct Event Relationship Networks (ERNs) for correlation analysis.

By examining these activities, we can see that activity (1) is relatively straightforward for system administrators since important event sources (e.g., Unix servers, NT servers, NetWare Severs, hubs, routers, ATM switches, UPS systems, applications, web servers, database servers, etc.) are very easy to identify. Activity (2) mostly relies on the quality and coverage of service providers' event source repertoires and their quality of knowledge management. Activity (3) involves customizing policy specifications and making processing decisions for the particular operation environment based on its special requirements. Activity (4) involves constructing ERNs, an ERN being a graphical representation of how events are correlated.

IBM Global Service has developed a toolset that translates a set of ERNs along with a default action template to event correlation rules ready to be used in event correlation engines like the Tivoli Enterprise Console. Therefore, activity (4) is the pivotal step of the EMD methodology. Proportional to the significance, our experience shows activity (4) usually requires the most time and domain expertise.

ERN construction can be significantly sped up if the service providers have corresponding ERNs as their intellectual capital. However, there are roughly 11,000 types of event sources currently working in business environments that might be taken in event management. Considering the tremendous diversity of event sources, such advantage should not be expected. Furthermore, the same type of event sources may be configured very differently in different operation environments. Also, the decisions about event processing policies may invalidate ERNs constructed under different policies.

These constraints indicate that revising and constructing ERNs are unavoidable in most cases. Consider a typical operation environment containing 20 event sources and 100 enterprise significant event types for each event source. Domain and device experts have to mentally figure out all the autonomous events among the 2000 event types and the correlations among the rest, and document them into ERNs. The time and cost that have to be spent on constructing ERNs is significant.

Beside the cost of constructing ERNs, the correctness and effectiveness of ERNs also have a great impact on the performance of event management. On one hand, incomplete ERNs cause correlation engines to fail to correlate events that are "symptoms" of the same "problem" and initiate more than enough notifications or actions, thus, deteriorating the second goal of event management. On the other hand, incorrect ERNs cause correlation engines to fail to take proper action or notify the correct people, thus, violating the first goal of event management. Worst of all, ERNs can be both incomplete and incorrect. The need of a method to validate and construct ERNs based on true and complete correlations is apparent.

SUMMARY OF THE INVENTION

The present invention provides techniques for using event data to automatically and semi-automatically validate, complete and construct event relationship networks (ERNs).

In a first aspect of the invention, a computer-based technique for use in accordance with an event management system comprises the following steps. One or more event relationship networks are automatically generated from event data, wherein an event relationship network comprises nodes representing events and links connecting correlated nodes. Then, the one or more generated event relationship networks are utilized to construct one or more correlation rules for use by a correlation engine in the event management system. In a semi-automatic portion of the technique, the one or more generated event relationship networks may be subjected to human review prior to utilizing the one or more generated event relationship networks to construct the one or more correlation rules.

In a second aspect of the invention, when one or more previously generated event relationship networks are available, the step of automatically generating one or more event relationship networks may comprise the following steps. First, one or more previously generated event relationship networks are obtained. Next, the one or more previously generated event relationship networks are validated by removing any nodes or links included therein that are incorrect for a particular application context. Then, the one or more previously generated event relationship networks are completed by adding any nodes or links thereto that are missing for the particular application context. Lastly, the one or more validated and completed event relationship networks are output as the one or more event relationship networks used to construct the one or more correlation rules.

The validating and completing steps preferably utilize a statistical correlation analysis. The statistical correlation analysis may utilize pairwise correlation analysis, wherein correlation between a pair of events is measured in accordance with one or more statistical measurements. Further, the validating step may comprise, for a particular event relationship network, determining that links in the event relationship network have a confidence level not less than a given threshold. This operation corresponds to validation of a weak correlation semantic. Still further, the validating step, for a particular event relationship network, may comprise: splitting the event relationship network into correlation paths; for every correlation path, remove a node that has the least number of correlated nodes associated therewith until every node is fully correlated with every other node; and merging correlation paths into one or more event relationship networks such that every path in a resulting event relationship network has every node fully correlated with every other node in the path. This operation corresponds to validation of a strong correlation semantic.

In a third aspect of the invention, when one or more previously generated event relationship networks are not available, the step of automatically generating one or more event relationship networks may comprise the following steps. First, patterns are mined or discovered from the event data. The mined patterns are then utilized to construct the one or more event relationship networks. Lastly, the one or more event relationship networks constructed from the mined patterns are output as the one or more event relationship networks used to construct the one or more correlation rules. The constructing step preferably utilizes a statistical correlation analysis to mine patterns. As above, the statistical correlation analysis may utilize pairwise correlation analysis.

In a fourth aspect of the invention, the one or more event relationship networks generated with the techniques described above may comprise annotations relating to statistical correlation between nodes.

Further, the event data used in the event relationship network generation techniques of the invention is preferably obtained from an event log representing historical events associated with a particular system being managed by the event management system. Still further, the event data may be preprocessed (e.g., throttled) prior to use in generating the one or more event relationship networks by removing at least a portion of any redundant events.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

It is known that true and complete event correlations are typically impossible to obtain because operational environments are always changing. However, the present invention realizes that the past is still the best indicator of the future. It is a norm that event correlation servers and middle layer managers have the capabilities of maintaining event repositories, typically in relational databases. The present invention, therefore, realizes that this historical event data provides the most reliable evidence of how one type of event is temporally correlated to other types of events. The present invention further realizes that the correlation implied in event data is very useful in confirming domain experts' hypotheses and, sometimes, providing surprising facts.

As mentioned, the present invention provides techniques for using event logs to validate, complete and construct event relationship networks (ERNs). In the remainder of the detailed description of the invention below, a brief description of ERNs is given. Next, an explanation is given on how to preprocess event data, via throttling, and obtain no redundant events. Then, a pairwise correlation measurement based on probabilistic and statistical concepts is described. With pairwise correlation defined, two semantics of global correlation are provided, namely, weak correlation and strong correlation. Then, a procedure for performing ERN validation, completion and construction is explained. In addition, an illustrative system structure and operating process are explained.

The approach taken by the present invention to describe correlation logic uses a conceptual framework called event relationship networks or ERNs. An ERN is a directed cyclic graph. Nodes are events and are labeled with the role of the event within the case. Arcs or links from one event to the next indicate that the latter is associated with or correlated with the former.

Figure 1:
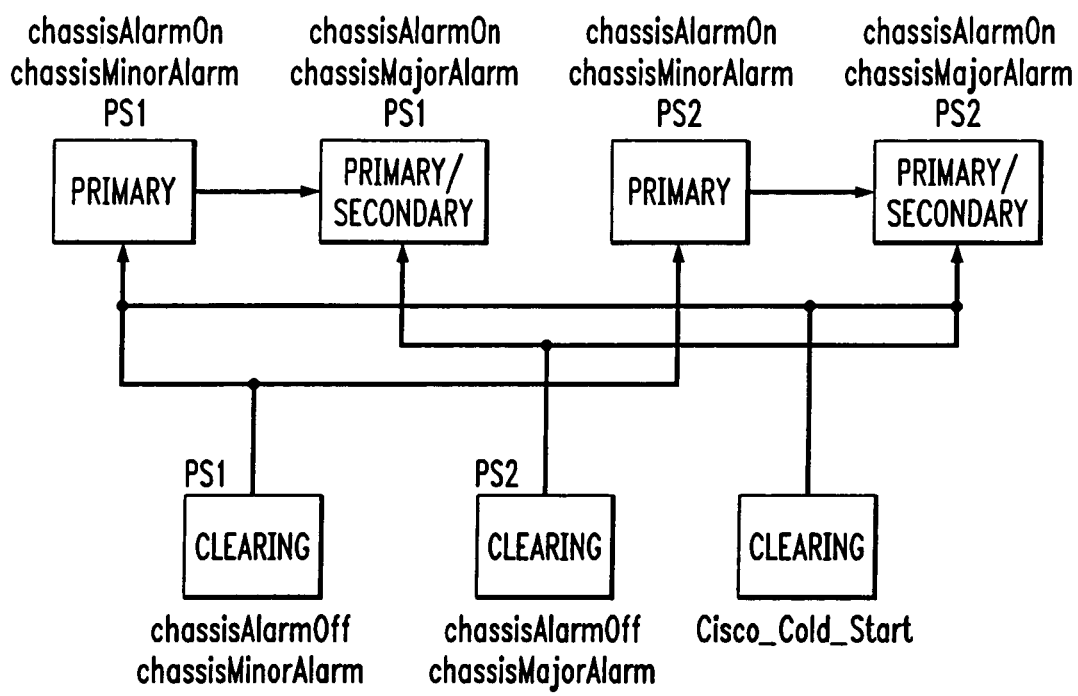
FIG. 1 is a diagram illustrating an event relationship network according to an embodiment of the present invention.

FIG. 1 is a diagram illustrating a simple event relationship network. In this example, a device on the distributed computing network that is being managed is referred to as a "chassis subagent." The chassis subagent emits "minor" and "major" alarm events as problematic incidents escalate in accordance with power supply units associated with the chassis subagent, namely, PS1 and PS2. As chassis status returns to normal the subagent emits an "alarmOff" event.

A key concept referred to herein as "event roles" is also introduced in FIG. 1. An event plays a primary role (i.e., is a primary event) if it provides an immediate, often unambiguous, indication as to the corrective action to take. For example, if a warning trap is the first event in the correlation case, then it is a primary event. Proactive management uses the receipt of a primary event to trigger a first level of response. As depicted in FIG. 1, the role of the chassisMinorAlarmOnPS1 and chassisMinorAlarmOnPS2 events are primary within the context of this example correlation case.

An event plays a secondary role (i.e., is a secondary event) if it is always extraneous in terms of selecting the corrective action in an exceptional situation. Although secondary events do not affect the choice of corrective action, they may invoke actions of their own.

If events were always either primary or secondary, then correlation would be much less complex. However, in a large number of cases, the role of an event depends on context within the correlation case. Events that may be either a primary or a secondary are called primary/secondary events. Within our example correlation case in FIG. 1, two events act in the role of primary/secondary, namely, the chassisMajorAlarmOnPS1 and the chassisMajorAlarmOnPS2 events.

There is an event role specified by events that identify the end of an incident. We refer to these as clearing events. Within our example correlation case in FIG. 1, chassisMinorAlarmOffPS1 and chassisMajorAlarmOnPS2 act in the role of the clearing event.

Figure 2:
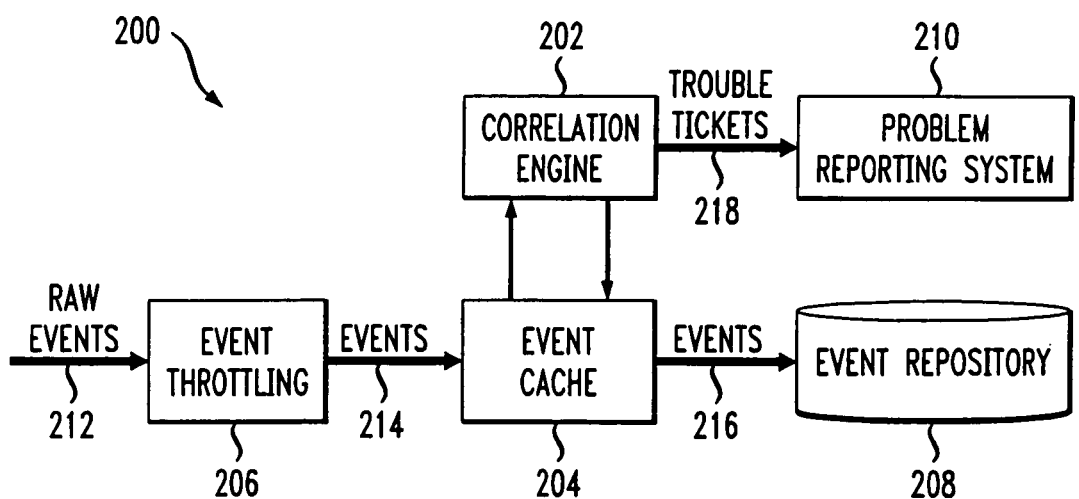
FIG. 2 is a block diagram illustrating an operational model associated with an event correlation engine according to an embodiment of the present invention.

Referring now to FIG. 2, a block diagram illustrates an operational model associated with an event correlation engine according to an embodiment of the present invention. It is to be understood that the operational purpose of constructing ERNs is to instruct correlation servers, on which correlation engines reside, a proper way to process events. So the semantics of the links in ERNs should be interpreted as the way correlation servers work. Correlation servers can be modeled as a rule-based trigger system with an event cache. Thus, as shown in FIG. 2, a correlation server 200 comprises a correlation engine 202, an event cache 204, an event throttling module 206, an event repository 208 and a problem reporting system 210.

As shown, raw events 212 are received by the correlation server 200. The raw events are preprocessed, via event throttling module 206, such that redundant events are removed. Event throttling will be explained below in greater detail. The preprocessed events 214 are then stored in event cache 204.

Thus, at any moment, the event cache 204 contains events received during the last period of a predefined duration. The rule-based triggering system (i.e., in accordance with the correlation engine 202 and the correlation rules implemented thereby) examines the content of the event cache 204 and determines whether any trigger rule should fire. The firing of a trigger rule results in the generation of a trouble ticket 218 which is sent on to the problem reporting system 210 for action to be taken by an operator and/or some response system in the network. Events 216 may be stored for further use in the event repository 208.

In this operational model, it is to be appreciated that event correlation is a temporal relationship. Such correlation capabilities are at the heart of systems management. Thus, we can apply algorithms and techniques developed for finding temporal coupling relationships.

Figures 3, 4:
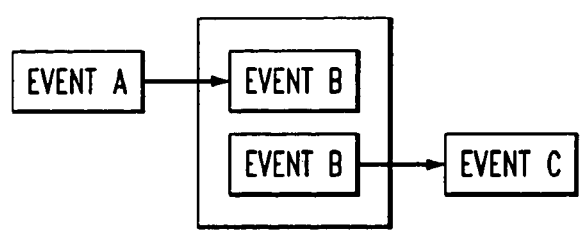
FIG. 3 is a table illustrating an event log according to an embodiment of the present invention.
FIG. 4 is a diagram for use in illustrating an incorrect global correlation.

Referring now to FIG. 3, a table illustrates an event log according to an embodiment of the present invention. It is to be understood that an event log, which as will be explained below is used to generate ERNs, may represent a portion of event data stored in the event cache 204 and/or the event repository 208. As shown, the event log 300 includes entries associated with an event for: timestamp 302; trap (or alert type) 304; time 306; host (or source of event) 308; category 310; and message 312. Each row 314 through 334 represents information associated with a particular event. By examining the event log, we can see evidence that supports some common correlation, for example, correlation between "Node_Up" and "Interface_Up" (with respect to host 3 in rows 320 and 322) and correlation between "Node_Down" and "Interface_Down" (with respect to host 6 in rows 332 and 334).

We can also see certain correlations that might somewhat surprise ERN designers. For example, we can see there are two cases (events 316 and 318 associated with host 2 and events 324 and 326 associated with host 4) that "Interface_Up" is correlated with "Node_Marginal." While "Interface_Up" is commonly regarded as an indicator that the host has been restored from non-operational status, a "Node_Marginal" event indicates the host is likely overloaded. Provided such observation, domain experts can look into the phenomena and determine the meaning of the correlation. It is most likely to be the case that "Node_Marginal" is simply a transient stage when a host is restoring the connection of the interface so host2 and host4 are working normally after time 00:40:59.

If the ERN designer erroneously considers every "Node_Marginal" as a problem, the consequence is twofold. First, many unnecessary trouble tickets will be issued. Second, the produced correlation rules could cause the correlation engine to keep those events in local cache all the time, hence, degrading the pattern matching performance.

As previously illustrated in the operational model of a correlation server in FIG. 2, raw events usually require preprocessing before being put into statistical testing. A common practice in event preprocessing is throttling. The purpose of throttling is to remove redundant events from the event stream before the event correlation server processes them.

For example, some probing events are generated periodically when a monitor agent has sensed anomalies. If the problem persists, the number of these periodically generated events tends to be much greater than the number of anomalies. Without throttling, events that occasionally happen together might be evaluated to a high confidence of coupling because the event repetition amplifies the coupling.

The following is a description of an illustrative throttling system that may be implemented to preprocess the raw event data. The system is parameterized by a 4-tuple (type, count, time period, time unit) where type is one of "First," "At" and "After;" count and time period are integers, and time unit is one of "Seconds," "Minutes," "Hours" and "Days." The meaning of the set of parameters can be exemplified as follows:

(First, 2, 5, Minutes): forward only first 2 event and ignore other occurrences of the event within the 5-minute time period.

(At, 3,1, Hours): forward only the 3rd event occurring in the one-hour time period.

(After, 2, 3, Minutes): forward all events occurring in the 3-minute time period after the 2nd event.

Historical event logs available for correlation analysis may be unprocessed reception logs of correlation engines. The same throttling process should be applied to historical event logs.

Thus, given the above description of how a correlation server may operate, the following portion of the detailed description provides illustrative event correlation criteria that may be used to construct correlation rules for use by the correlation engine in accordance with an ERN.

First, we provide a concept referred to as pairwise correlation. It is to be appreciated that the concept of pairwise correlation is described in the U.S. patent application Ser. No. 09/976,575 filed concurrently herewith and entitled: "Systems and Methods for Pairwise Analysis of Event Data," the disclosure of which is incorporated by reference herein. While pairwise correlation is a preferred criteria for generating correlation rules from patterns in the event data, it is to be understood that other techniques may be used.

Recall that an ERN is a directed cyclic graph. Nodes are events and are labeled with the role of the event within the case, while links from one event to the next indicate that the latter is associated with or correlated with the former. In accordance with the concept of pairwise correlation, the invention employs two types of correlation: (1) weak global correlation; and (2) strong global correlation. Both types of correlation provide a way to compute link confidences. We assume a reasonable window length w that will be set as the time window of the event cache. For each link (A,B), we compute the following confidence statistics:

$$\text{ConfAB} = \langle N^A, P_{B|A}, \chi_{AB}^2 \rangle, \text{ where:}$$

$N^A$ is the total number of occurrences of event type A. $N^A$ indicates whether the event type A, as well as the link, are worth being included in an ERN. In a sense, $N^A$ represents the possible cost of applying an incomplete ERN. As previously stated, incomplete ERNs can cause unnecessary trouble tickets. The cost of processing these redundant trouble tickets caused by missing link (A,B) is proportional to $N^A$. So, for a large $N^A$, the link is included in the ERN if other statistics also indicate high correlation. For a small $N^A$, the "cost" of the decision is up to the domain expert's judgment.

$P_{B|A}$ is the conditional probability that an occurrence of event type A is followed by an occurrence of event type B within time no later than w. This is defined as: (number of windows containing both A and B)/(the number of windows containing A).

$\chi_{AB}^2$ is the chi-squared test score of the A-B coupling which indicates the deviation of A's and B's distribution from a random distribution. A high $\chi_{AB}^2$ score indicates it is likely that the two events happen non-randomly, or have some relationship but do not occur together by accident.

The $\chi_{AB}^2$ test score is defined through the following statistics. The probability of observing an event A in a window is $$P_A = \frac{N_A}{T}$$

where T is the time covered in the log. The expected probability of finding both event A and event B in a window with event A occurring before event B is $E(P_{AB}) = P_A + P_B/2$. The actual probability of finding both event A and event B in a window with event A occurring before event B is $$P_{B|A} = \frac{N_{AB}}{2T}$$

where $N_{AB}$ is the number of (A,B) event pairs. The variance of co-occurrences of event A and event B is defined as $$VAR_{AB} = \frac{P_{AB}(1 - P_{AB})}{T}.$$

The $\chi_{AB}^2$ test score is defined as:

$$\chi_{AB}^2 = \frac{(P_{B|A} - E(P_{AB}))^2}{VAR_{AB}}.$$

Thresholds of the link confidence are also in the form of a triple $\langle N_t, P_t, \chi_t^2 \rangle$ such that a link (A,B) is valid if $N_A \geq N_t$, $P_{AB} \geq P_t$ and $\chi_{AB}^2 \geq \chi_t^2$. Note that it is possible that both links (A,B) and (B,A) are valid. In such cases, the direction of link (A,B) should be from A to B if $P_{B|A} \geq P_{A|B}$, otherwise, the direction should be from B to A.

Thus, the confidence of a link represents the likelihood that the two events linked are emitted together and in that order. In accordance with the two correlation semantics of the present invention, an ERN is valid in weak correlation if all links have confidences higher than a given threshold. An ERN is valid in strong correlation if the link confidence between any node and all its transitive successors (e.g., successor of successor, successor of successor of successor, etc.) are valid in the ERN.

Referring now to FIG. 4, a diagram is presented for use in illustrating an incorrect global correlation. As shown in FIG. 4, event A leads to a first event B, and a second event B leads to an event C. Thus, while a link between A and the first event B may be valid and a link between the second event B and C may be valid, a link of A to B to C may not be valid. But if there is a low correlation threshold set, then the first B event could still be correlated to event C. Thus, the sum of pairwise correlation does not necessarily show the whole picture, especially when the given threshold is low.

More particularly, suppose in this example that the given threshold of conditional probability is 40%. Assume that link (A,B) and (B,C) both have confidences higher than 40%. Then, this ERN is valid in a weak correlation semantic. As stated above, an ERN is valid in weak correlation if all links have confidences higher than a given threshold. But a further investigation may show that link (A,C) has very weak correlation such that it should not be placed in the same ERN. This is a motivating force for introducing the notion of strong correlation, as defined above.

Figure 5:
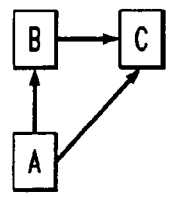
FIG. 5 is a diagram illustrating the concept of ERN stratification according to an embodiment of the present invention.
Figure 6:
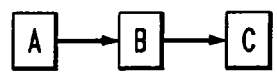
FIG. 6 is a diagram further illustrating the concept of ERN stratification according to an embodiment of the present invention.

FIGS. 5 and 6 are diagrams illustrating the concept of ERN stratification according to an embodiment of the present invention. For weak correlation, the main task is to stratify ERNs so the path between any two nodes, if it exists, is unique. The purpose of ERN stratification is to eliminate any link between two nodes that have longer paths between them. In the case shown in FIG. 5, there is more than one path from A to C, namely, A to B to C, and A to C directly. The path from A to B to C is a longer path than the direct path between A and C. Thus, according to the notion of stratification, the link from A to C should be eliminated. The resulting ERN is shown in FIG. 6.

In cases where there is more than one longest path, we eliminate the one with the weakest link. The weakest link is the link with the smallest conditional probability. In the cases where the links form a cycle, the weakest link is eliminated.

Figure 7:
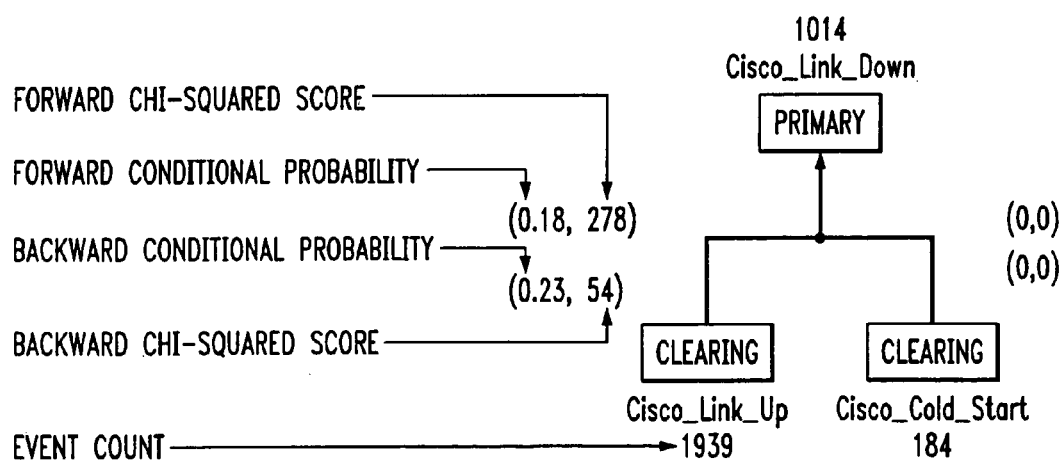
FIG. 7 is a diagram illustrating the concept of ERN validation according to an embodiment of the present invention.

FIG. 7 is a diagram illustrating the concept of ERN validation according to an embodiment of the present invention. ERNs constructed in different installations or at different times may be used as starter sets for generating correlation rules. The task is to validate whether the correlation specified in the existing ERNs is valid in the environment of interest. The validation of weak correlation is straightforward. Users specify the window length w and the event log file. Then, an ERN validation, completion and construction (VCC) system, as will be illustrated and explained below, annotates the nodes and links. A preferred annotation format is illustrated in accordance with FIG. 7.

More particularly, FIG. 7 shows a simple ERN with three nodes (event types) annotated by statistics obtained from an event log of 90 days with specified window size 60 seconds. The count of an event types is placed near the corresponding node, e.g., Cisco_Link_Down has 1014 occurrences. Each link is annotated with two pairs of probabilities and $\chi^2$ score, namely, $(P_{B|A}, \chi^2_{AB})$ and $(P_{A5\,1\,B}, \chi^2_{BA})$. For example, the link from Cisco_Link_Up to Cisco_Link_Down has conditional probability 0.18 and $\chi^2$ score 278. The reverse link has conditional probability 0.23 and $\chi^2$ score 54. These statistics can be interpreted in the following way. The forward conditional probability, 0.18, is smaller than the backward conditional probability. Usually, this means the direction of the link should be reversed. However, Cisco_Link_Up is a clearing event. The link direction should remain unless the forward confidence is smaller than the threshold. Although the conditional probabilities do not look significant at first glance, the $\chi^2$ scores, however, indicate otherwise. Consider a log history containing 129,600 non-overlapping windows, then conditional probabilities 0.18 and 0.23 are actually very high. This fact is indicated by the $\chi^2$ scores which imply the two events are correlated with more than 99% confidence. The risk of missing the link (A,B) can be calculated as 1014*0.23=242. Also, it is very clear that Cisco_Cold_Start should not be included in this ERN because both the conditional probabilities and $\chi^2$ scores are 0.

With respect to the validation of the two correlation semantics of the invention, it is to be appreciated that validation of strong correlation is comparatively more complicated than validating weak correlation. Thus, validation of strong correlation contains the following three steps:

1. Split the ERN into correlation paths. For every source node (i.e., nodes with no incoming link) find paths to every reachable sink node (i.e., nodes with no outgoing link).

2. For every correlation path, remove the node that has the least number of correlated nodes, upstream or downstream, until every node has full correlation with every other node.

3. Merge correlation paths to ERNs with a constraint that every path in the resulting ERN is a valid path in step 2.

As implied by the definition of strong correlation, an ERN might be split to several ERNs after strong correlation validation.

Figure 8:
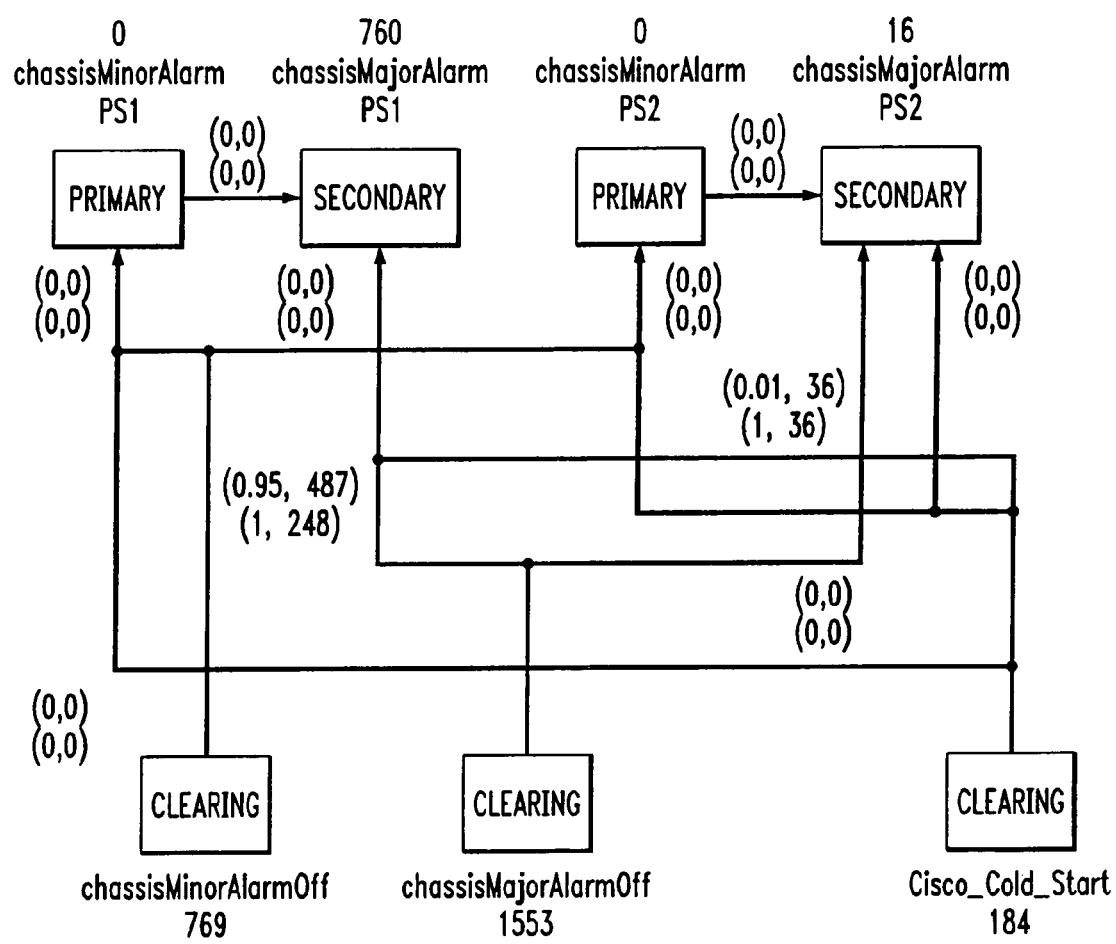
FIG. 8 is a diagram illustrating a process of validating an ERN by event logs according to an embodiment of the present invention.

FIG. 8 is a diagram illustrating a process of validating an ERN by an event log according to an embodiment of the present invention. More particularly, FIG. 8 illustrates an annotated ERN of a higher complexity than the annotated ERN shown in FIG. 7. As is evident, in the validation process, pairwise correlation statistics are annotated on links for domain experts to determine how to modify the ERNs. The annotated ERN in FIG. 8 shows some relationships that may be contrary to intuition. For example, "Minor Alarms" do not correlate to "Major Alarms" on both PS1 and PS2. Also, clearing events "chassisMinorAlarm" and "Cisco__Cold_Start" do not actually clear alarm events.

Figure 9:
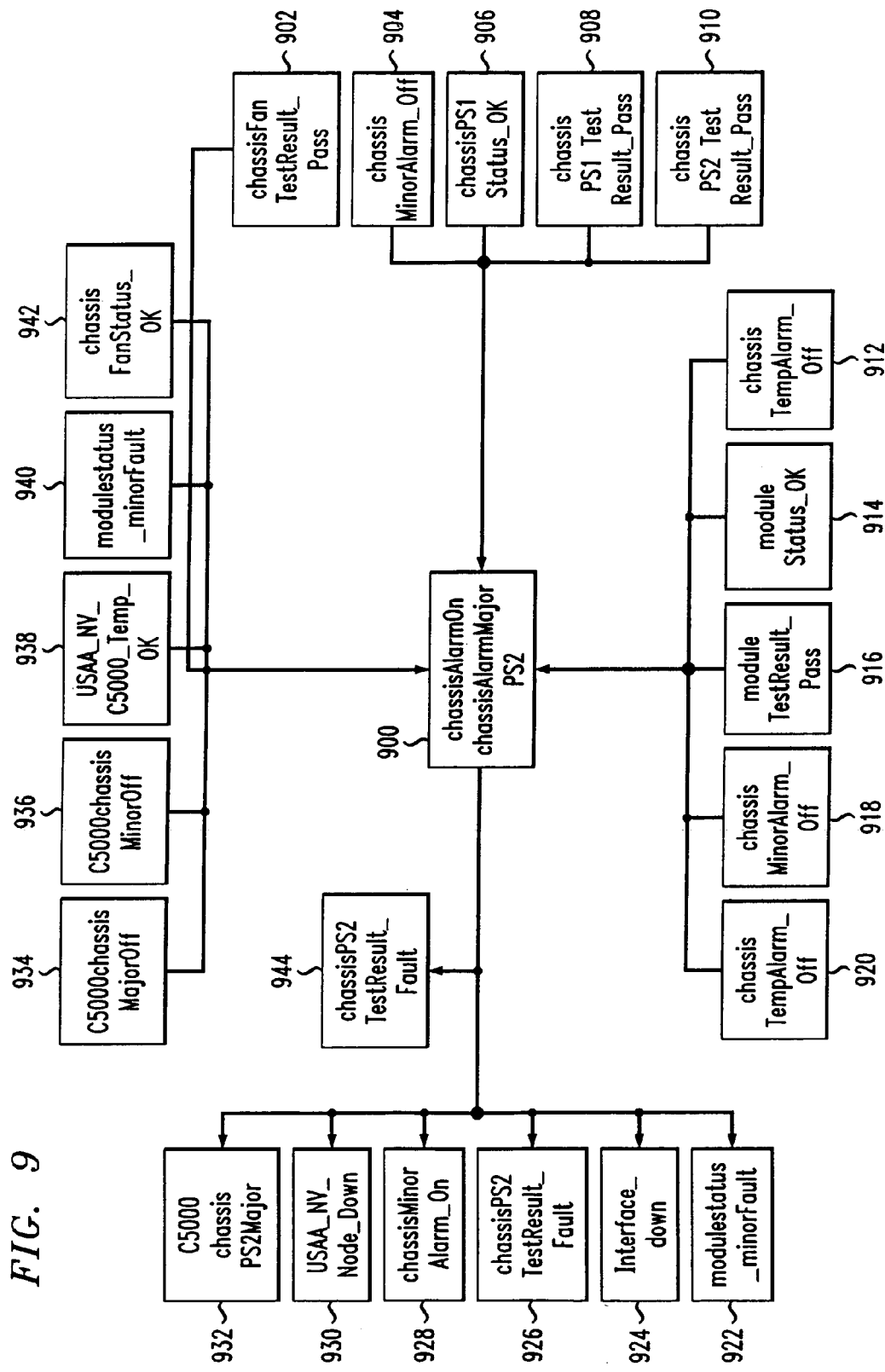
FIG. 9 is a diagram illustrating a process of completing and constructing an ERN according to an embodiment of the present invention.

FIG. 9 is a diagram illustrating a process of completing and constructing an ERN according to an embodiment of the present invention. For a given ERN, the validation method described above can identify incorrect links. But identifying missing nodes and links from ERNs requires searching all event types to find those correlated event types already in ERNs. This completion process is done in an iterative manner. In each iteration, all event types correlated to any event type in current ERNs are attached with corresponding links. The process proceeds until no more event types can be added.

Even a very simple completion procedure can be very helpful to ERN designers. In this case, we take an event type, chassisMajorAlarmPS2 as denoted as block 90 in FIG. 900, from a real production environment, which does not seem to be correlated to other event types in existing ERNs. However, by computing its correlation (as described above) with all event types shown in an event log, we found there are 22 event types (denoted as blocks 902 through 944 in FIG. 9) that show strong pairwise correlation with the event type. Among the 22 event types, 15 event types (blocks 902 through 920 and blocks 934 through 942) are clearing events, one event type (block 944) tends to occur before the target event (block 900), and 6 event types (blocks 922 through 932) tend to occur after the target event.

In situations where no existing ERN can be used for a starter set, the ERN validation, completion and construction (VCC) system of the invention is responsible for generating ERNs for subject matter experts to review. ERN construction can be treated as a special case of ERN completion where no ERN is available. However, the corresponding computation is more expensive because the system has to start with computing all pairwise correlations instead of with only those containing at least one event in existing ERNs.

The ERN VCC system is designed to work closely with subject matter experts. We propose a data-driven design process. If there is an ERN starter set, the process starts by validating and completing the starter set. Otherwise, the system constructs an initial set of ERNs. Human experts can always modify machine-generated ERNs and put them back to the ERN VCC system for revalidation. A complete and correct set of ERNs can usually be obtained in a few iterations.

Figure 10:
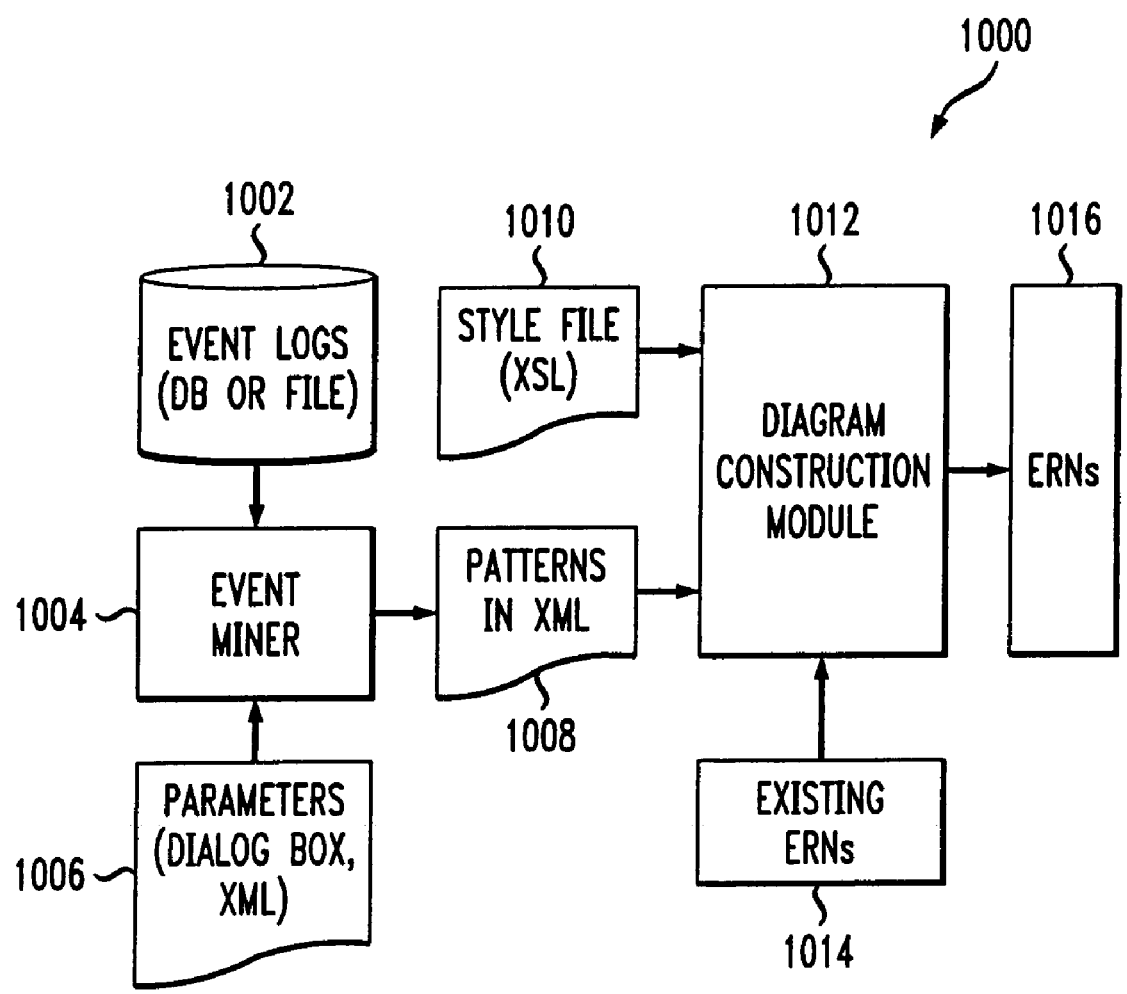
FIG. 10 is a block diagram illustrating an ERN validation, completion and construction system according to an embodiment of the present invention.

FIG. 10 is a block diagram illustrating an ERN VCC system according to an embodiment of the present invention. The system 1000 uses event logs 1002 in files or databases as input. The event miner component 1004 performs pairwise correlation on events with predefined threshold parameters 1006 (e.g., Dialog boxes, XML). The output of the event miner module is patterns 1008 in XML format. A default XSL (XML style sheet) file 1010 is provided along with the patterns to diagram construction module 1012, which is a set of Visio VBA scripts (e.g., glue, transform interact). Existing ERNs 1014, if available, are taken in at this point for validation. Validated or constructed ERNs 1016 are the final output of the system.

Figure 11:
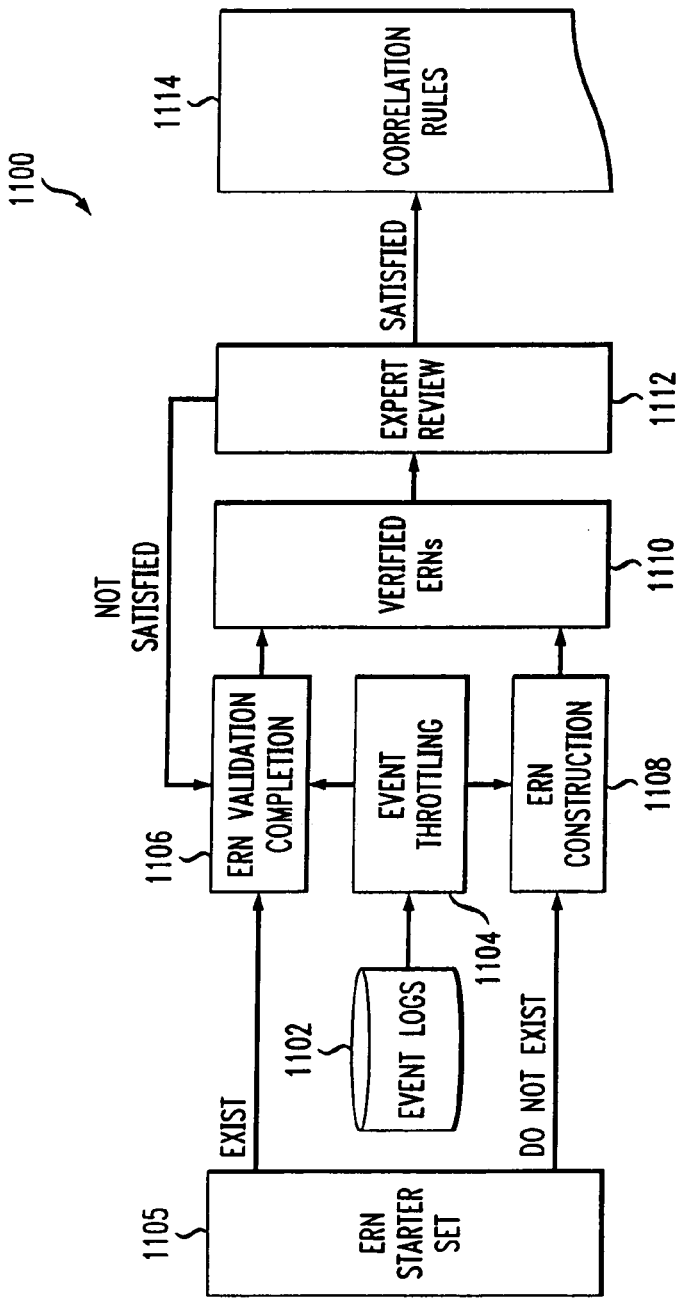
FIG. 11 is a diagram illustrating an ERN validation, completion and construction process according to an embodiment of the present invention.

FIG. 11 is a diagram illustrating an ERN validation, completion and construction process according to an embodiment of the present invention. It is to be appreciated that the validation, completion and construction process of ERNs is an iterative process, with both automatic statistical analysis (e.g., pairwise correlation) and domain experts review. This process is illustrated in more detail in FIG. 11.

As shown, the ERN VCC process 1100 takes event data 1102 as input and, in step 1104, throttles the event data, as previously described, to remove redundancies in the event data. Assuming an ERN starter set 1105 exits, an ERN validation/completion process 1106 is performed on the event data. Assuming no ERN starter set 1105 exits, an ERN construction process 1108 is performed on the event data. Such automated statistical analysis processes yield one or more verified ERNs 1110. Domain experts review the output ERNs in block 1112 and determine the final ERNs. If they are not satisfied with the automatically generated ERNs, the domain experts instruct the system to repeat the process. If they are satisfied, the ERNs are used to construct correlation rules 1114, as is known. Thus, as explained above, the operational purpose of constructing ERNs is to instruct correlation engines, in accordance with the constructed correlation rules, a proper way to process events.

Figure 12:
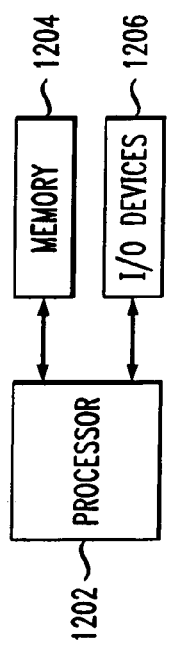
FIG. 12 is a block diagram illustrating a generalized hardware architecture of a computer system suitable for implementing an ERN validation, completion and construction system according to the present invention.

Referring now to FIG. 12, a block diagram is shown illustrating a generalized hardware architecture of a computer system suitable for implementing the various functional components/modules of an ERN VCC system as depicted in the figures and explained in detail herein. It is to be understood that the individual components of the ERN VCC system may be implemented on one such computer system, or on more than one separate such computer system. Also, individual components of the system may be implemented on separate such computer systems. It is also to be appreciated that the correlation server components (of FIG. 2) may be implemented on one or more such computer systems.

As shown, the computer system may be implemented in accordance with a processor 1202, a memory 1204 and I/O devices 1206. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data to the processing unit, and/or one or more output devices (e.g., CRT display, printer, etc.) for presenting results associated with the processing unit. For example, user interfaces of the system employed by a domain expert (e.g., to review ERNs, specify event logs, etc.) may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) as an article of manufacture and, when ready to be utilized, loaded in part or in whole (e.g., into RAM) and executed by a CPU.

It is to be appreciated that the rule validation, completion and construction techniques described herein may be employed in accordance with the off-line event management decision support system described in the U.S. patent application Ser. No. 09/976,540 filed concurrently herewith and entitled: "Systems and Methods for Providing Off-Line Decision Support for Correlation Analysis," the disclosure of which is incorporated by reference herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method for use in accordance with an event management system, the method comprising the steps of:

automatically generating one or more event relationship networks from event data, wherein an event relationship network comprises a graphical representation wherein nodes represent events and links connect correlated nodes; and utilizing the one or more generated event relationship networks to construct one or more correlation rules for use by a correlation engine in the event management system;

wherein, when one or more previously generated event relationship networks are available, the step of automatically generating one or more event relationship networks comprises:

obtaining one or more previously generated event relationship networks:

validating the one or more previously generated event relationship networks by removing any nodes or links included therein that are incorrect for a particular application context;

completing the one or more previously generated event relationship networks by adding any nodes or links thereto that are missing for the particular application context;

outputting the one or more validated and completed event relationship networks as the one or more event relationship networks used to construct the one or more correlation rules;

further wherein the validating step. for a particular event relationship network, comprises:

splitting the event relationship network into correlation paths;

for every correlation path, removing a node that has the least number of correlated nodes associated therewith until every node is fully correlated with every other node; and merging correlation paths into one or more event relationship networks such that every path in a resulting event relationship network has every node fully correlated with every other node in the path.

2. The method of claim 1, further comprising the step of subjecting the one or more generated event relationship networks to human review prior to utilizing the one or more generated event relationship networks to construct the one or more correlation rules.

3. The method of claim 1, wherein the validating and completing steps utilize a statistical correlation analysis.

4. The method of claim 3, wherein the statistical correlation analysis utilizes pairwise correlation analysis, wherein correlation between a pair of events is measured in accordance with one or more statistical measurements.

5. The method of claim 1, wherein the validating step comprises, for a particular event relationship network, determining that links in the event relationship network have a confidence level not less than a given threshold.

6. The method of claim 1, wherein, when one or more previously generated event relationship networks are not available, the step of automatically generating one or more event relationship networks comprises:

mining patterns from the event data;

utilizing the mined patterns to construct the one or more event relationship networks;

outputting the one or more event relationship networks constructed from the mined patterns as the one or more event relationship networks used to construct the one or more correlation rules.

7. The method of claim 6, herein the constructing step utilizes a statistical correlation analysis to mine patterns.

8. The method of claim 6, wherein the statistical correlation analysis utilizes pairwise correlation analysis, wherein correlation between a pair of events is measured in accordance with one or more statistical measurements.

9. The method of claim 1, wherein the event data is obtained from an event log representing historical events associated with a particular system being managed by the event management system.

10. The method of claim 1, wherein the one or more event relationship networks comprise annotations relating to statistical correlation between nodes.

11. The method of claim 1, wherein the event data is preprocessed prior to use in generating the one or more event relationship networks by removing at least a portion of any redundant events.

12. Apparatus for use in accordance with an event management system, the apparatus comprising:
- at least one processor operative to: (i) automatically generate one or more event relationship networks from event data, wherein an event relationship network comprises a graphical representation wherein nodes represent events and links connect correlated nodes; and (ii) utilize the one or more generated event relationship networks to construct one or more correlation rules for use by a correlation engine in the event management system; and
- memory, coupled to the at least one processor, which stores at least one of the event data and the one or more event relationship networks;
- wherein, when one or more previously generated event relationship networks are available, the operation of automatically generating one or more event relationship networks comprises:
- obtaining one or more previously generated event relationship networks;
- validating the one or more previously generated event relationship networks by removing any nodes or links included therein that are incorrect for a particular application context;
- completing the one or more previously generated event relationship networks by adding any nodes or links thereto that are missing for the particular application context; and
- outputting the one or more validated and completed event relationship networks as the one or more event relationship networks used to construct the one or more correlation rules;
- wherein the validating operation, for a particular event relationship network, comprises:
- splitting the event relationship network into correlation paths;
- for every correlation path. removing a node that has the least number of correlated nodes associated therewith until every node is fully correlated with every other node; and
- merging correlation paths into one or more event relationship networks such that every path in a resulting event relationship network has every node fully correlated with every other node in the path.

13. The apparatus of claim 12, wherein the at least one processor is further operative to permit the operation of subjecting the one or more generated event relationship networks to human review prior to utilizing the one or more generated event relationship networks to construct the one or more correlation rules.

14. The apparatus of claim 12, wherein the validating and completing operations utilize a statistical correlation analysis.

15. The apparatus of claim 14, wherein the statistical correlation analysis utilizes pairwise correlation analysis, wherein correlation between a pair of events is measured in accordance with one or more statistical measurements.

16. The apparatus of claim 12, wherein the validating operation comprises, for a particular event relationship network, determining that links in the event relationship network have a confidence level not less than a given threshold.

17. The apparatus of claim 12, wherein, when one or more previously generated event relationship networks are not available, the step of automatically generating one or more event relationship networks comprises:
- mining patterns from the event data;
- utilizing the mined patterns to construct the one or more event relationship networks;
- outputting the one or more event relationship networks constructed from the mined patterns as the one or more event relationship networks used to construct the one or more correlation rules.

18. The apparatus of claim 17, wherein the constructing operation utilizes a statistical correlation analysis to mine patterns.

19. The apparatus of claim 17, wherein the statistical correlation analysis utilizes pairwise correlation analysis, wherein correlation between a pair of events is measured in accordance with one or more statistical measurements.

20. The apparatus of claim 12, wherein the event data is obtained from an event log representing historical events associated with a particular system being managed by the event management system.

21. The apparatus of claim 12, wherein the one or more event relationship networks comprise annotations relating to statistical correlation between nodes.

22. The apparatus of claim 12, wherein the event data is preprocessed prior to use in generating the one or more event relationship networks by removing at least a portion of any redundant events.

23. An article of manufacture for use in accordance with an event management system, the article comprising a machine readable storage medium containing one or more programs which when executed implement the steps of:
- automatically generating one or more event relationship networks from event data, wherein an event relationship network comprises a graphical representation wherein nodes represent events and links connect correlated nodes; and
- utilizing the one or more generated event relationship networks to construct one or more correlation rules for use by a correlation engine in the event management system;
- wherein, when one or more previously generated event relationship networks are available, the step of automatically generating one or more event relationship networks comprises:
- obtaining one or more previously generated event relationship networks;
- validating the one or more previously generated event relationship networks by removing any nodes or links included therein that are incorrect for a particular application context;
- completing the one or more previously generated event relationship networks by adding any nodes or links thereto that are missing for the particular application context;
- outputting the one or more validated and completed event relationship networks as the one or more event relationship networks used to construct the one or more correlation rules;
- further wherein the validating step, for a particular event relationship network, comprises:

splitting the event relationship network into correlation paths;

for every correlation path, removing a node that has the least number of correlated nodes associated therewith until every node is fully correlated with every other node; and merging correlation paths into one or more event relationship networks such that every path in a resulting event relationship network has every node fully correlated with every other node in the path.

24. A computer-based method for use in accordance with an event management system, the method comprising the steps of:

automatically generating one or more event relationship networks from event data, wherein an event relationship network comprises a graphical representation wherein nodes represent events and links connect correlated nodes; and utilizing the one or more generated event relationship networks to construct one or more correlation rules for use by a correlation engine in the event management system;

further wherein automated generation of at least one of the one or more event relationship networks comprises use of an automated pairwise statistical correlation procedure which is configured to compute a first correlation metric and a second correlation metric, the second correlation metric being representative of a correlation between events that is stronger than a correlation between events represented by the first correlation metric.

25. The method of claim 24, further wherein automated generation of at least one of the one or more event relationship networks comprises specifying an event data window within which event data is considered.

* * * * *

UNITED STATES PATENT AND TRADEMARK OFFICE
CERTIFICATE OF CORRECTION

PATENT NO. : 7,631,058 B2  Page 1 of 1
APPLICATION NO. : 09/976543
DATED : December 8, 2009
INVENTOR(S) : Grabarnik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1494 days.

Signed and Sealed this

Second Day of November, 2010

David J. Kappos
*Director of the United States Patent and Trademark Office*